United States Patent Office.

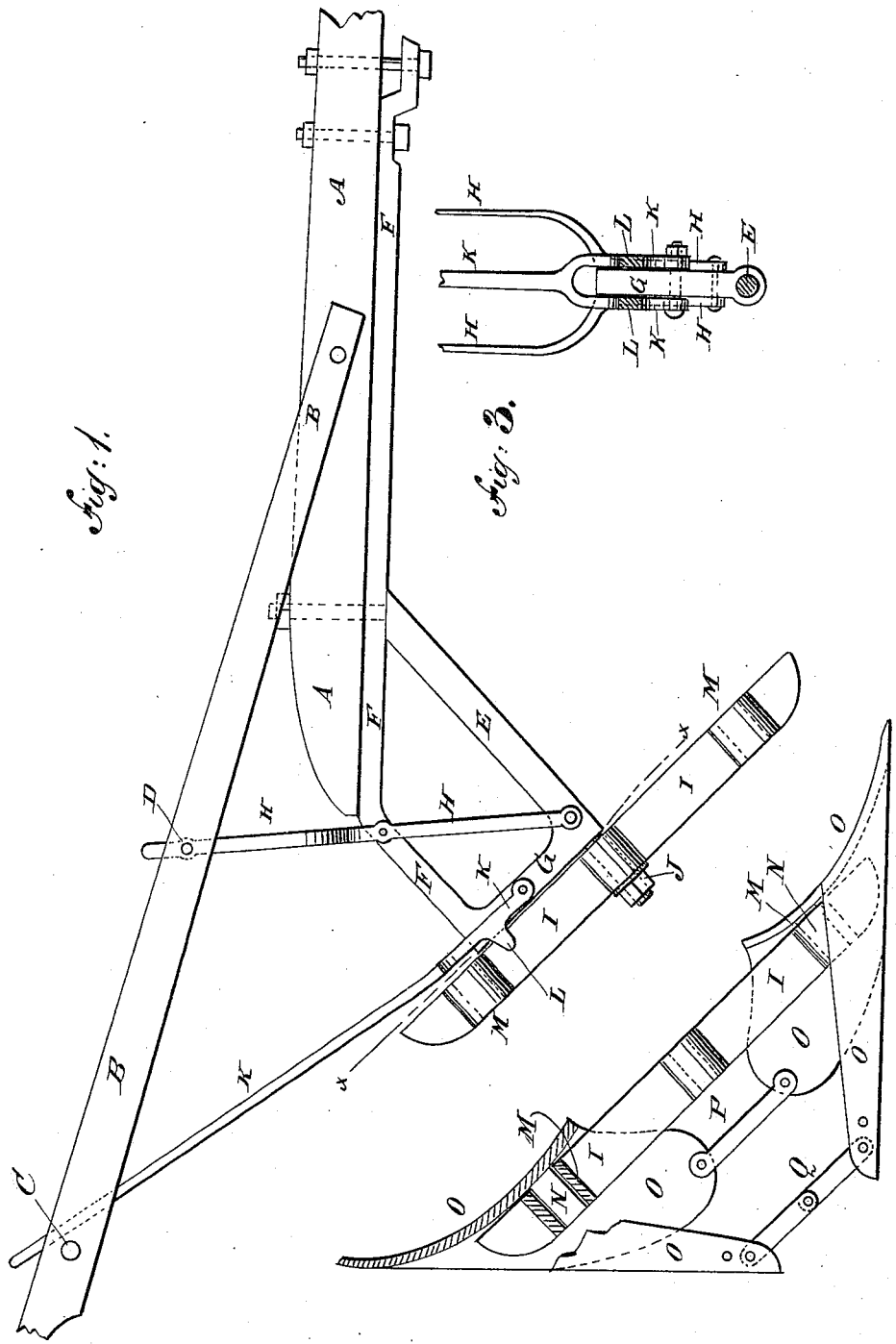

WILLIAM L. QUICK, OF MOLINO, TENNESSEE.

PLOW.

SPECIFICATION forming part of Letters Patent No. 303,455, dated August 12, 1884.

Application filed April 23, 1884. (No model.)

*To all whom it may concern:*

Be it known that I, WILLIAM L. QUICK, of Molino, in the county of Lincoln and State of Tennessee, have invented a new and useful Improvement in Plows, of which the following is a full, clear, and exact description.

Reference is to be had to the accompanying drawings, forming part of this specification, in which similar letters of reference indicate corresponding parts in all the figures.

Figure 1 is a side elevation of the stock and foot of my improved plow. Fig. 2 is a side elevation, partly in section, of the foot and two attached plows. Fig. 3 is a sectional under side view of a part of the same, taken through the line $x\ x$, Fig. 1.

The object of this invention is to provide plows constructed in such a manner that they can be readily adjusted for the various kinds of plowing required in preparing ground for seed and in cultivating plants.

The invention consists, therefore, of the combination of parts and their construction, substantially as hereinafter fully set forth and claimed.

A represents a plow-beam, to the opposite sides of the rear part of which are attached the forward ends of the handles B. The handles B are connected, near their rear and forward ends, respectively, by rounds C D.

E is an inclined bar, the upper end of which, or a bolt formed upon or attached to the said upper end, passes through the beam A, and has a nut screwed upon it.

To the under side of the plow-beam A is bolted a bar, F, the forward end of which projects downward and forward to adapt it to serve as a hammer-strap to receive and support the double-tree. The bar F is welded to the inclined bar E, and its rear part, at the rear end of the plow-beam A, is inclined downward parallel with the said inclined bar E, so that its lower end may serve as a brace and stop to support the foot (hereinafter described) against the pressure of the soil. The lower ends of the bars E F can be connected by a bar, G, welded or otherwise secured to them to give firmness to the said bars. The handles B are supported at the proper elevation by brace-rods H, attached at their upper ends to the said handles, or to the lower rod, D, at their middle parts to the bar F, and at their lower ends to the bar E or G. The lower end of the bar E projects, is rounded to pass through a hole in the center of the foot I, and serves as a pivot to the said foot, and has a screw-thread upon it to receive a nut, J, for fastening the said foot upon it.

To the bar G or E is pivoted the forked lower end of the lever K, which has lugs L upon the lower sides of its branches, to pass down upon the opposite sides of the rear part of the foot I and lock the said foot in place. The upper end of the lever K extends upward between the handles B, and rests, when fastening the foot I, upon the rear round, C, so that it can be readily reached and operated by the plowman to fasten and release the said foot I.

In the end parts of the foot I are formed holes M, to receive lugs or bolts N, formed upon or attached to the plows O, to fasten the said plows in place. The plows O can be further secured in place by bars P Q, attached, respectively, to the mold-boards and landsides of the said plows. In the drawings the plows O are represented as being turn-plows, so that the plow can be used for plowing upon level or inclined ground; but any kind of plows can be used as the work to be done may require; or different kinds of plows can be attached to the ends of the foot I, and one or the other used, as desired—as, for instance, a small plow can be attached to one end of the foot for cultivating close to rows of plants, and a larger plow attached to the other end of the said foot for opening the furrow between the rows; or a subsoil-plow can be attached to one end of the foot I, and an ordinary plow attached to its other end, and either used as required.

Having thus described my invention, what I claim as new, and desire to secure by Letters Patent, is—

1. In a plow, the plate affixed to the under side of the beam A, and having the downwardly and rearwardly inclined arm F, having the downwardly and forwardly inclined extension G, from which extension projects upwardly and forwardly a bracket, E, abutting at its upper end against said plate, said extension having a stud-pivot, in combination with the foot I, and means to retain said foot as against turning, substantially as and for the purpose set forth.

2. In a plow, the beam A, having the frame or pendant F, with a downwardly and forwardly inclined extension, G, and the foot I, having plows connected thereto, in combination with the lever K, with its lower bifurcated end pivoted to and embracing said extension, and having lips or projections L, extending downwardly from the prongs of its bifurcated portion alongside of said foot, substantially as shown and described, and for the purpose set forth.

3. In a plow, the combination, with the pivoted shoe I, having the end sockets or apertures, M, of the plows O, having stud N upon the under sides of their front portions, and with their wings connected by links P, and their landsides connected by jointed or articulated links Q, substantially as and for the purpose set forth.

WILLIAM L. QUICK.

Witnesses:
JNO. R. HANCOCK,
J. A. TALLEY.